Dec. 15, 1959     K. H. SCHÜTZ     2,916,980
DEPTH-OF-FIELD INDICATOR FOR PHOTOGRAPHIC OBJECTIVES
Filed Nov. 8, 1956     2 Sheets-Sheet 1
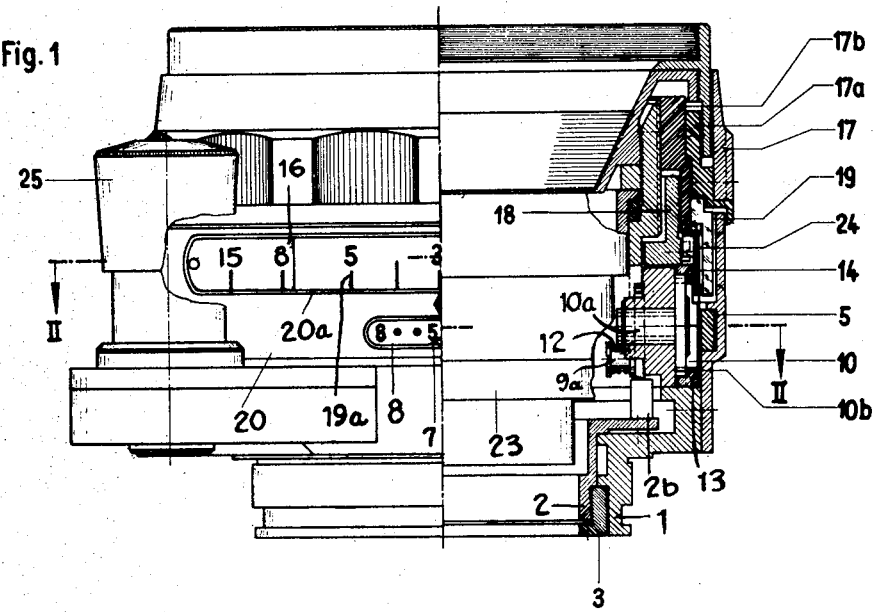
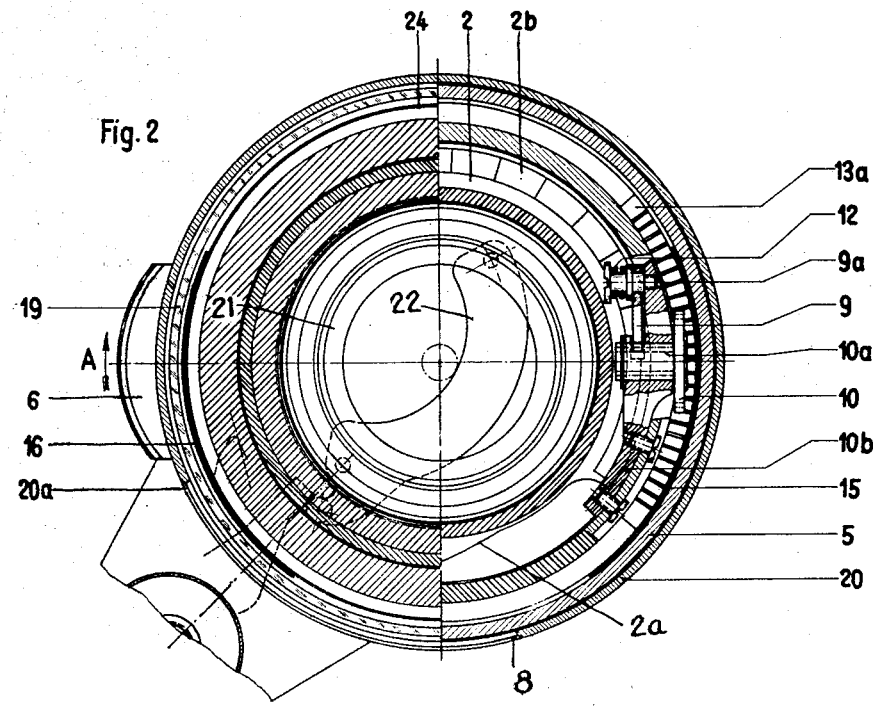
Inventor:
KARL HEINZ SCHÜTZ
BY Karl F. Ross
AGENT

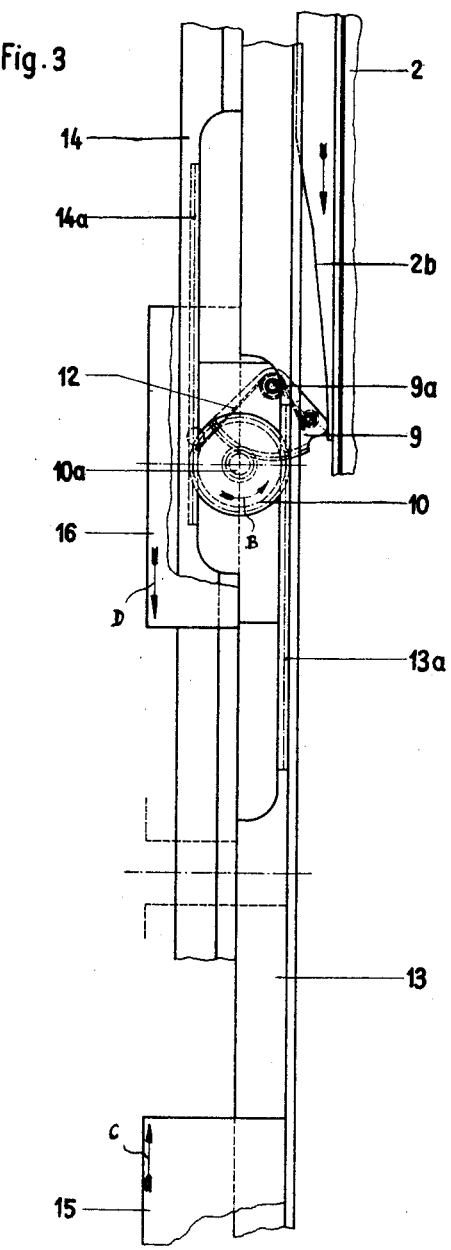

United States Patent Office 2,916,980
Patented Dec. 15, 1959

2,916,980

DEPTH-OF-FIELD INDICATOR FOR PHOTOGRAPHIC OBJECTIVES

Karl Heinz Schütz, Kreuznach, Germany, assignor to Jos. Schneider & Co., Optische Werke, Kreuznach, Rhineland, Germany, a firm of Germany Application November 8, 1956, Serial No. 621,492

Claims priority, application Germany November 12, 1955

4 Claims. (Cl. 95—64)

My present invention relates to mechanism for automatically indicating the depth of field in a photographic objective, especially one having a lens barrel whose axial displacement for focusing purposes is controlled by a rotatable element to which it is connected by screw threads.

The depth of field (or depth of focus), as is well known, is that range of distance both ahead and back of the selected focusing distance throughout which satisfactory definition of the projected image is obtained. Given a blur circle of constant diameter, the extent of this range is determined by the focal length and the relative aperture of the objective. Thus, in the case of a given focal length it is possible to vary the depth of field with the diaphragm aperture, it being of course desirable to have means for correlating each diaphragm stop with the corresponding field range.

Earlier arrangements designed to provide the desired depth-of-field indications include, for example, a special indicator ring bearing engravings or colored markings by means of which the focusing range corresponding to each diaphragm setting can be read on the adjacent scale of the distance indicator. This arrangement lacks the required accuracy in the case of objectives of great focal length, where the limits of the focusing range are close together, and also in those instances where the distance scale cannot be conveniently equipped with suitable reference lines.

In commonly assigned co-pending application Ser. No. 373,326, filed August 10, 1953, by Franz Werner, there has been disclosed a depth-of-field indicator comprising a pair of rings, centered on the optical axis of an objective system, which are coupled with the usual diaphragm-control member for rotation in opposite directions and which carry markers positioned for cooperation with a rotatable scale whose own movement is determined by the distance-control element, i.e. by the element which effects the axial displacement of the lens barrel.

The general object of the present invention is to provide an improved system of the general character described in the aforesaid Werner application.

A more particular object of this invention is to provide means for making more readily distinguishable the depth-of-field indications furnished by a system of this character.

Another more specific object of my invention is to provide a modification of the aforedescribed Werner system in which the scale-bearing member may be positioned directly adjacent a windowed portion of the objective housing through which the scale may be viewed, rather than at a distance therefrom to afford clearance for the movement of the markers, whereby greater compactness and protection against the entrance of dust into the objective casing is achieved.

In accordance with the instant invention I provide a scale-bearing ring, or ring segment, of light-transmissive (transparent or translucent) material directly back of a housing portion having a cutout or window through which this scale may be viewed, the scale being displaceable by means of the distance-control element, and back of the scale support I mount the two movable markers in the form of ring segments with a dark or light-absorbing surface effectively masking the parts of the distance scale registering with them.

The contrast between the masked and the unmasked scale portions may be enhanced by positioning a brightly colored backing surface behind the scale and the markers.

The invention will be described in greater detail with reference to the accompanying drawing in which:

Fig. 1 shows an objective according to the invention partly in view and partly in axial section;

Fig. 2 is a cross-section taken on the line II—II of Fig. 1; and

Fig. 3 shows the range-indicating mechanism in developed form.

The figures of the drawing correspond to Figs. 1–3 of the above-identified Werner application and like reference numerals have been used where applicable.

At 1 there is shown a support, carrying a bayonet-type coupling, on which there is rotatably mounted the control member 2 for the diaphragm aperture. This member takes the form of a contoured disk having a curved periphery 2a representing a diaphragm-setting cam and further having a flange extending in a rough helix around part of the periphery of the disk, this flange defining a curve 2b representing a cam for the actuation of the range indicator. Control disk 2 is mounted in support 1 by means of a ring 3 inserted in the latter and threadedly engaging the former.

The positioning of the disk 2 is effected by means of an actuating ring 5 which is positively coupled with this disk through a connecting pin (not shown) and carries a setting knob 6; ring 5 bears on its outer periphery the diaphragm scale 7 which, as shown in Fig. 1, is visible through a window 8 provided in a stationary sleeve 20 which in turn is rigid with support 1. A sector gear 9, pivotable about a pin 9a, meshes with a pinion 10a which is rigid with a coaxial gear 10 and, together with the latter, is rotatably mounted on a block 10b also supporting the pin 9a; sector gear 9 is urged against cam 2b by a spring 12 wound around pin 9a.

A pair of indicator rings 13 and 14, whose countersunk gear teeth 13a, 14a engage the gear 10 on opposite sides, are rotatably held in support 1 and are coaxial with the disk 2 as well as with the axially displaceable lens barrel 23. The setting ring for the focusing control, shown at 17, is connected via intermediate ring 17a with a further ring 17b with in turn threadedly engages the focusing tube 18 rigid with lens barrel 23. At 21 there is shown the slotted diaphragm-control ring which is mounted on ball bearings in the lens barrel and controls the position of the iris leaves 22 (only one shown) in a manner which is well known per se.

The coupling between the control member 2 and the ring 21 has not been specifically illustrated but may involve the transmission of power through the lever action of one of the iris leaves 22, such as the one shown in Fig. 2, by way of a rearward extension (dotted lines) thereof, the diameter of the diaphragm aperture being determined by the angular position of disk 2 whose contour 2a coacts with a diaphragm-setting lever arm, e.g. in the manner disclosed in commonly assigned application Ser. No. 373,327, filed August 10, 1953, by Franz Werner, now Patent No. 2,803,182, issued August 20, 1957.

Supported on the ring 17b, for rotation therewith, is a scale-bearing ring 19 of transparent or translucent material whose markings 19a, indicative of distance, are visible through a window 20a in the stationary sleeve 20. Ring 17b also carries a bright-surfaced (e.g. white) ring 24 which forms a contrasting background behind the scale 19a of ring 19; it will be noted from Fig. 1 that ring 19 is positioned directly back of sleeve 20 with its window 20a but that a clearance has been provided between the rings 19 and 24, this clearance serving to accommodate a pair of thin, preferably darkly colored (e.g. red) ring segments 15 and 16 which are carried on the indicator rings 13 and 14, respectively. When these segments 15, 16 interpose themselves between contrast ring 24 and a part of scale 19a visible through window 20a, such part will be effectively obscured; thus the segments 15, 16 act as markers to indicate the boundaries of a zone representing the depth of field for a particular setting of the objective. It should be noted that the obscured portions are not completely blocked out, so that the distance markings on scale 19a may be read even if the segments 15, 16 move very close together.

More specifically, the operation of my improved system as hereinabove disclosed is as follows:

When the setting knob 6 is rotated, say, clockwise (direction of arrow A) as viewed in Fig. 2, ring 5 turns until the desired marking of its diaphragm scale 7 appears in the window 8. Cam disk 2 rotates in the same sense and its curve 2b acts upon the sector gear 9, causing the latter to rotate clockwise (as viewed in Fig. 3) against the action of its restoring spring 12. Pinion 10a and gear 10 rotate counterclockwise (arrow B) and cause the indicator rings 13, 14 to rotate in opposite directions (arrows C and D, respectively) in planes perpendicular to the optical axis of the system until their riders 15 and 16 occupy a new position, e.g. as indicated in dot-dash lines. The depth of field can now be read on the scale 19a whose position is independently adjustable to a desired focusing distance by means of setting ring 17.

My invention is, of course, not limited to the specific embodiment described and illustrated but is susceptible of numerous modifications and adaptations without departing from the spirit and scope of the appended claims.

I claim:

1. An objective system comprising a housing, a lens barrel axially displaceable in said housing, focusing means controlling the displacement of said lens barrel, a diaphragm with adjustable aperture in line with said lens barrel, a movable diaphragm-control member operatively coupled with said diaphragm, said housing being provided with a window, a scale-bearing annular element of light-transmissive material rotatably positioned within said housing adjacent said window, said element having a portion bearing markings visible through said window and indicative of focusing distance as established by the displacement of said lens barrel, mechanism operatively linking said element with said focusing means for rotation of said element around the axis of said lens barrel, a contrast ring having a strongly light-reflecting surface positioned with clearance inside said element in line with said window, a pair of ring segments movable in mutually opposite direction between said contrast ring and said element, said segments having a strongly light-absorbing surface movable for progressive registry with said portion and with said window, and coupling means operatively connecting said segments with said diaphragm-control member for movement independent of said element.

2. An objective system according to claim 1, wherein said coupling means comprises a pair of coaxial indicator rings coupled for rotating in opposite directions about said axis, each of said segments being mounted on a respective one of said indicator rings.

3. An objective system according to claim 2, wherein said coupling means further includes gear means in mesh with said indicator rings, a sector gear in mesh with said gear means and cam means for controlling the position of said sector gear.

4. An objective system according to claim 3, wherein said diaphragm-control member includes a rotatable disk centered on said axis, said cam means comprising a contoured flange rising in axial direction from the periphery of said disk.

References Cited in the file of this patent

UNITED STATES PATENTS

| 1,918,556 | Pfau | July 18, 1933 |
| 2,342,819 | Priesemann | Feb. 29, 1944 |
| 2,527,106 | Smith | Oct. 24, 1950 |

FOREIGN PATENTS

| 926,768 | Germany | Apr. 25, 1955 |

OTHER REFERENCES

Werner, German application, Serial No. Sch 10721 IXa/572, printed October 27, 1955.